United States Patent [19]
Duerr et al.

[11] 3,867,448
[45] Feb. 18, 1975

[54] TRIFLUOROMETHYLPHENYL-FORMAMADINES AND ACETAMIDINES

[75] Inventors: Dieter Duerr, Bottmingen; Hans Aebi, Riehen; Ludwig Ebner, Stein, all of Switzerland

[73] Assignee: Ciba-Geigy AG, Basel, Switzerland

[22] Filed: Feb. 22, 1972

[21] Appl. No.: 228,326

Related U.S. Application Data

[60] Division of Ser. No. 864,244, Aug. 7, 1969, abandoned, which is a division of Ser. No. 569,828, Aug. 6, 1966, Pat. No. 3,487,156, which is a continuation-in-part of Ser. No. 515,772, Oct. 8, 1965, abandoned, which is a division of Ser. No. 262,863, Mar. 5, 1963, Pat. No. 3,284,289.

[30] Foreign Application Priority Data
Mar. 8, 1962   Switzerland.......................... 2800/62

[52] U.S. Cl. ... 260/564 R, 260/239 B, 260/247.5 R, 260/268 R, 260/293.78, 260/295.5 S, 260/326.5 L, 260/326.86, 260/501.14, 260/501.21, 71/38, 71/94, 71/95, 71/113, 71/121, 424/248, 424/250, 424/266, 424/267, 424/274, 424/326
[51] Int. Cl. .......................................... C07c 123/00
[58] Field of Search..... 260/295.5 S, 564 R, 501.14, 260/501.21

[56] References Cited
OTHER PUBLICATIONS
Chem. Abstracts, Vol. 60, 14,443e-g, June 8, 1964, abstracting Belgian Patent No. 629,317 dated October 21, 1963.

*Primary Examiner*—Alan L. Rotman
*Attorney, Agent, or Firm*—Frederick H. Rabin

[57] ABSTRACT
Compounds of the formula

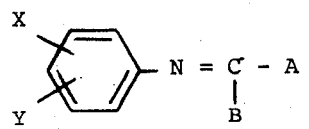

in which

X is hydrogen, chlorine, bromine, lower alkyl, lower alkoxy or $CF_3$,

Y is hydrogen, bromine, lower alkyl, lower alkoxy, halophenoxy or $CF_3$,

A is di-lower-alkylamino, piperidino, pyrrolidino, morpholino, 4-methylpiperazino or hexamethyleneimino, and B is hydrogen or methyl, and their salts, are pesticidally effective compounds useful for the control of acarids and insects. Of particular note are those compounds in which Y is $CF_3$ in the 3-position, X is hydrogen, chlorine or $CF_3$, and A is dimethylamino.

5 Claims, No Drawings

TRIFLUOROMETHYLPHENYL-FORMAMADINES AND ACETAMIDINES

This is a division of application Ser. No. 864,244, filed on Aug. 7, 1969 now abandoned, which is a division of application Ser. No. 569,828 filed Aug. 6, 1966, now U.S. Pat. No. 3,487,156. Said application Ser. No. 569,828 was a continuation-in-part of application Ser. No. 515,772, filed Oct. 8, 1965, now abandoned which in turn was a division of application Ser. No. 262,863, filed Mar. 5, 1963, now U.S. Pat. No. 3,284,289.

The present invention provides preparations for combating pests, especially for combating undesired plant growth and harmful micro-organisms, insects, acarids and nematodes, which preparations contain as active substance a compound of the general formula

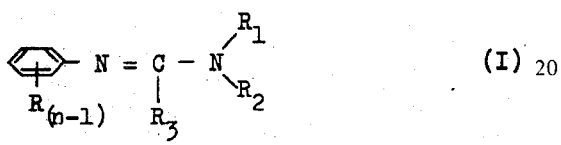

in which R represents a halogen atom or a lower alkyl, alkoxy or halogenalkyl radical or a phenoxy radical that may be substituted by at least one halogen atom or a lower alkyl, alkoxy or halogen-alkyl radical or represents the group $-CF_3$, $NO_2$, $-CN$, $-SCN$, $n$ represents an integer of a value from 1 to 4, $R_1$ represents an alkyl radical containing 1 to 3 carbon atoms, $R_2$ and $R_3$ are identical or different and represent hydrogen or a lower alkyl group, and the radicals $R_1$ and $R_2$ may together form part of a heterocyclic ring together with the nitrogen atom, or the salts of these compounds, together with a carrier. The carrier may be a solvent, a diluent, a dispersing agent, a wetting agent or an adhesive and there may also be present a fertilizer or another pesticide.

Among the compounds of the general formula (I), there may be mentioned more especially those in which R represents a halogen atom or a lower alkyl or alkoxy radical, or a phenoxy radical that may be substituted by a halogen atom or a lower alkyl or alkoxy radical or represents the group $-CF_3$ or $-NO_2$, $n$ represents the integer 1 or 2, $R_1$ and $R_2$ represent the methyl or ethyl radical, and $R_3$ represents hydrogen or the methyl radical, or the salts of these compounds. As acids there may be used, for the formation of the salts with the bases set forth above practically any usual inorganic or organic acid, for example HCl, HBr, HJ, HF, $H_2SO_4$, $H_3PO_4$, $HPO_3$, $HNO_3$, $HClO_4$, $HSO_3NH_2$, $CH_3COOH$, $CCl_3COOH$, citric acid, lactic acid, formic acid, oxalic acid, glycollic acid, benzoic acid, oleic acid; 2,3,6-trichloro-benzoic acid, dodecyl benzene sulfonic acid, salicylic acid, nicotinic acid; $CH_3-CCl_2-COOH$.

The preparation of the compounds of the general formula (I) is advantageously carried out by heating the appropriate aryl-isocyanates with an N:N-disubstituted amide of a lower carboxylic acid, for example, dimethylformamide, N:N-dimethylacetamide, N-formyl- and N-acetylpyrrolidine or piperidine. The course of the reaction can easily be followed by the $CO_2$ that is developed.

Instead of the isocyanates, the corresponding carbamic acid chlorides can be used with similar success.

Another method of preparing the compounds of the general formula (I) consists in reacting a compound of the general formula

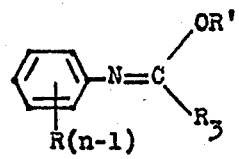

in which R and n have the meaning ascribed to them in the general formula (I), R' represents a lower alkyl group and $R_3$ represents a hydrogen atom or a lower alkyl group, with an amine of the general formula

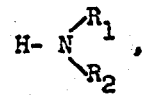

in which $R_1$ and $R_2$ have the meaning ascribed to them in the general formula (I).

By virtue of the wide scope of their biocidal action, the new products have the special advantage that they can be used for combating a very wide variety of vegetable and animal pests.

The compounds of the invention are not only suitable as herbicides; they can also be used in plant protection when applied in a concentration that does not allow a phytotoxic action and are highly effective in combating harmful microorganisms, for example, fungi, such as for example, Alternaria solani, Phytopthora infestans and Septoria appii, and in combating harmful aphids, insects, acarids and nematodes.

Furthermore, the new compounds can also be used as general microbicides, for example, in combating species of Aspergillus, and as insecticides, for example, for combating gnats, flies and the larvae thereof.

When preparing solutions of the compounds of the general formula (I) that can be used as such for spraying there may be used as solvents, for example, mineral oil fractions with a high to medium boiling range such as Diesel oil or kerosene, coal tar oils and oils of vegetable or animal origin, and hydrocarbons for example alkylated naphthalenes, tetra-hydronaphthalene, if desired, with the use of xylene mixtures, cyclo-hexanols or ketones, and chlorinated hydrocarbons for example trichlorethane, tetrachlorethane, trichloroethylene, trichlorobenzene and tetrachlorobenzene. It is advantageous to use organic solvents having a boiling point above 100°C.

The preparations may also be in the form of emulsion concentrates, pastes or wettable powders, which can be diluted with water to give aqueous spraying liquors. As emulsifiers or dispersing agents there may be used non-ionic products, for example, condensation products of ethylene oxide with aliphatic alcohols, amines or carboxylic acids containing a long-chain hydrocarbon radical of 10 to 20 carbon atoms, for example a condensation product of octadecyl alcohol and 25 to 30 mols of ethylene oxide, or of soya bean fatty acid and 30 mols of ethylene oxide, or of commercial oleylamine and 15 mols of ethylene oxide, or of dodecyl mercaptan and 12 mols of ethylene oxide. As anionic emulsifiers there may be mentioned; the sodium salt of dodecyl alcohol sulfuric acid ester, the sodium salt of dodecyl benzene sulfonic acid, the potassium or triethanolamine salt of oleic acid or of abietic acid or of a mixture of these acids, or the sodium salt of a petroleum sulfonic acid. As cationic dispersing agents there may be mentioned quaternary ammonium compounds, for example cetyl pyridinium bromide or dihydroxyethyl benzyl-dodecyl-ammonium chloride.

Dusting or strewing preparations may contain as solid carriers, talcum, kaolin, bentonite, calcium carbonate or calcium phosphate, or carbon, cork powder, wood meal or other materials of vegetable origin. It is also very advantageous to use the preparations in a granulated form. The various forms of preparations may contain the usual materials that improve their distribution, adhesive power, rain resistance or penetrating power; as such materials there may be mentioned: fatty acids, resins, glue, casein or alginates.

The preparations of the invention can be used either alone or in admixture with the usual pest-combating agents, especially insecticides, acaricides, nematocides, bactericides or other fungicides or herbicides.

The present invention also provides a member selected from the group consisting of A. a compound of the formula

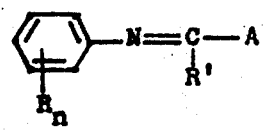

wherein R represents a member selected from the group consisting of the chlorine atom, the bromine atom, a lower alkyl radical, a lower alkoxy radical, a chlorophenoxy radical, the $NO_2$-radical and the $CF_3$-radical, n represents a number of at most 2, R' represents a member selected from the group consisting of the hydrogen atom and the methyl radical, and A represents a member selected from the group consisting of (a) the radical

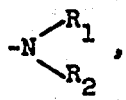

wherein $R_1$ represents a member selected from the group consisting of the hydrogen atom and a lower alkyl radical, and $R_2$ represents a lower alkyl radical, and (b) a 5 to 7-membered heterocyclic radical containing at most 2 nitrogen atoms and at most 1 oxygen atom, which is attached to the remainder of the molecule by a nitrogen atom, and B. a salt of a compound set forth above under (A) with an acid.

The following Examples illustrate the invention, the parts and percentages being by weight.

EXAMPLE 1

I

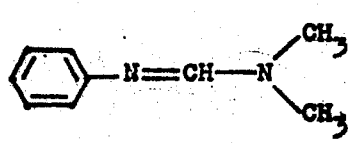

N-phenyl-N':N'-dimethyl-formamidine a. Free base

100 Milliliters of carefully purified dimethylformamide and 50 milliliters of phenylisocyanate were heated under reflux with the exclusion of moisture until the evolution of carbon dioxide was finished. The solution was then fractionated in vacuo. After a first-running of unreacted dimethylformamide, the product distilled at 140°C under a pressure of 18 millimeters of Hg.

Yield: 39.5 grams.

b. Hydrogen sulfate

20 Grams of the free base obtained as described under I$a$ were dissolved in 50 milliliters of absolute alcohol. To this solution were added, dropwise with cooling, 13.5 grams of concentrated sulfuric acid. The resulting crystals were filtered off and washed with ether.

Yield: 26 grams.

Melting point: 169° to 182°C (recrystallized from absolute alcohol)

Analysis:       $C_9H_{14}O_4N_2S$
Calculated:   43.89% C;   5.73% H;   11.38% N
Found:         43.94% C;   5.84% H;   11.28% N

II

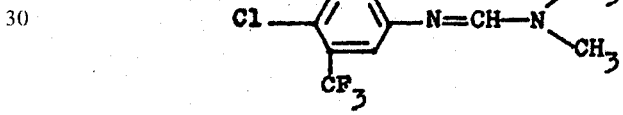

N-3-trifluoromethyl-4-chlorophenyl-N':N'-dimethyl-formamidine a. Free base

This was prepared from 60 grams of 4-chloro-3-trifluoromethylphenyl-isocyanate and 100 milliliter of dimethylformamide by the method described under I$a$. Boiling point: 164°C at 18 millimeters of Hg.

Yield:           77 grams.
Analysis:     $C_{10}H_{10}N_2ClF_3$
Calculated:  47.92% C;   4.02% H;   14.15% Cl
Found:        47.93% C;   4.27% H;   14.40% Cl b. The hydrogen sulfate was prepared from 20 grams of the free base II$a$ and 7.9 grams of concentrated sulfuric acid by the method described under I$b$.
Yield: 21.5 grams, melting point 203° to 205°C (recrystallized from absolute alcohol).

Analysis:     $C_{10}H_{12}O_4N_2Cl\ S\ F_3$
Calculated:  34.44% C;   3.47% H;   10.17% Cl
Found:        34.69% C;   3.66% H;   9.88% Cl

III

N-3-trifluoromethylphenyl-N':N'-dimethyl-
formamidine
Free base

This was prepared from 60 grams of meta-tri-fluoromethyl-phenylisocyanate and 100 milliliter of dimethylformamide by the method described under Ia. Yield 73 grams. Boiling point: 93° to 95°C at 0.01 millimeters of Hg.

| Analysis: | C₁₀H₁₁NF₃ | | |
|---|---|---|---|
| Calculated: | 55.55% C; | 5.13% H; | 12.96% N |
| Found: | 55.31% C; | 5.41% H; | 12.82% N |

IV 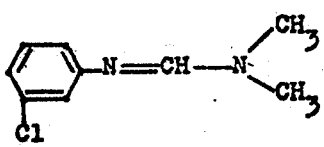

N-3-chlorophenyl-N':N'-dimethyl-formamidine
a. Free base

This was prepared from 60 grams of meta-chlorophenylisocyanate and 100 milliliters of dimethyl-formamide by the method described under Ia. Yield: 55 grams. Boiling Point: 124°C at 0.05 millimeters of Hg.

| Analysis: | C₉H₁₁N₂Cl | |
|---|---|---|
| Calculated: | 59.18% C; | 6.07% H |
| Found: | 58.9% C; | 6.2% H | b. Perchlorate

This was prepared from 20 grams of the free base IVa and 12 milliliters of perchloric acid of 60 percent strength in absolute alcohol. Melting point: 183° to 185°C (recrystallized from a mixture of alcohol and ether).

| Analysis: | C₉H₁₂O₄N₂Cl₂ | | |
|---|---|---|---|
| Calculated: | 38.18% C; | 4.27% H; | 25.05% Cl |
| Found: | 38.17% C; | 4.25% H; | 25.21% Cl |

V. 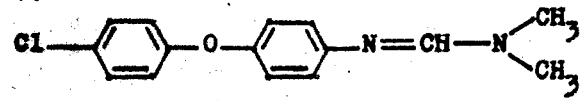

N-para-chlorophenoxyphenyl-N':N'-dimethylformamidine
a. Free base

This was prepared from 60 grams of para-chlorophenoxyphenyl-isocyanate and 100 milliliters of dimethylformamide. Yield: 50 grams. Melting point: 80° to 81.5°C. Boiling point 209°C at 0.05 millimeters of Hg.

| Analysis: | C₁₅H₁₅ON₂Cl |
|---|---|
| Calculated: | 12.91% Cl |
| Found: | 13.13% Cl | b. Hydrogen sulfate

This was prepared from 20 grams of the free base Va and 7.2 grams of concentrated sulfuric acid by the method described under Ib. Yield: 21 grams. Melting point: 186 to 194°C (recrystallized from absolute alcohol).

| Analysis: | C₁₅H₁₇O₅N₂ClS | | |
|---|---|---|---|
| Calculated: | 48.32% C; | 4.60% H; | 9.51% Cl. |
| Found: | 48.6% C; | 4.5% H; | 9.7% Cl. |

VI. 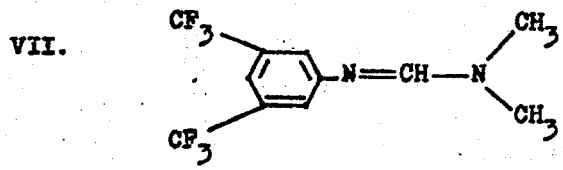

N-para-bromophenyl-N':N'-dimethyl-formamidine
Free base

This was prepared by heating 50 grams of para-bromophenyl-isocyanate with 100 milliliters of dimethylformamide.

Yield: 45 grams.
Boiling point: 173°C at 14 millimeters of Hg

| Analysis: | C₉H₁₁N₂Br | | |
|---|---|---|---|
| Calculated: | 47.60% C; | 4.88% H; | 12.34% N |
| Found: | 47.3% C; | 4.9% H; | 12.1% N |

VII.

N-3:5-ditrifluoromethylphenyl-N':N'-dimethylformamidine
Perchlorate:

This was prepared by heating 50 milliliters of 3:5-ditrifluoromethylphenylisocyanate with 100 milliliters of dimethylformamide until the evolution of gas ceased. The solution was cooled and 22 milliliters of perchloric acid of 60 percent strength were added dropwise. The product was precipitated with ether. Yield: 70 grams. Melting point: 256° to 261°C (after recrystallization from a mixture of alcohol and ether).

| Analysis: | C₁₁H₁₁O₄N₂ClF₆ | | |
|---|---|---|---|
| Calculated: | 34.35% C; | 2.88% H; | 7.28% N. |
| Found: | 34.37% C; | 2.65% H; | 7.24% N. |

VIII. 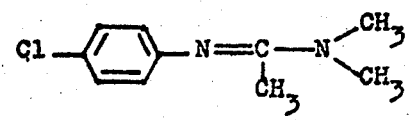

N-para-chlorophenyl-N':N'-dimethyl-acetamidine.
  Perchlorate:
This was prepared by heating 50 grams of para-chlorophenyl-isocyanate with 100 milliliters of N:N-dimethylacetamide at 130°C until the evolution of gas ceased. The solution was cooled and the calculated amount of perchloric acid of 60 percent strength was added. A total of 29 grams of the desired amidine in the form of perchlorate was precipitated by the addition of ether.

Melting point: 129°C (after recrystallization from a mixture of alcohol and ether).

| Analysis: | $C_{10}H_{14}O_4N_2Cl_2$ |
|---|---|
| Calculated: | 9.43% N; |
| Found: | 9.61% N. |

IX. 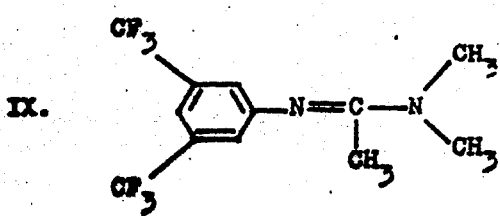

N-3:5-ditrifluoromethylphenyl-N':N'-dimethyl-acetamidine
  Perchlorate:
This was prepared from 100 milliliters of N:N-dimethylacetamide, 50 milliliters of 3:5-ditrifluoromethylphenylisocyanate and 21.5 milliliters of perchloric acid of 60 percent strength by a method analogous to that described under VIII. Yield: 70.5 grams in the form of perchlorate. Melting Point: 285° to 288°C (after recrystallization from a mixture of alcohol and ether).

| Analysis: | $C_{12}H_{13}O_4N_2ClF_3$ | | |
|---|---|---|---|
| Calculated: | 36.15% C; | 3.29% H; | 7.03% N |
| Found: | 36.25% C; | 3.17% H; | 7.09% N |

X. 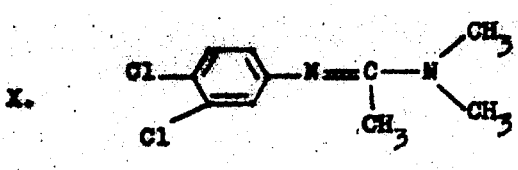

N-3:4-dichlorophenyl-N':N'-dimethyl-acetamidine
  Perchlorate:
This was prepared from 100 milliliters of N:N-dimethylacetamide, 50 grams of 3:4-dichlorophenyl-isocyanate and 25 milliliters of perchloric acid of 60 percent strength by a method analogous to that described under VIII. Yield: 21 grams in the form of perchlorate. Melting point: 213° to 221°C (after recrystallization from alcohol).

| Analysis: | $C_{10}H_{13}N_2Cl_3O_4$ |
|---|---|
| Calculated: | 8.45% N |
| Found: | 8.4% N |

XI. 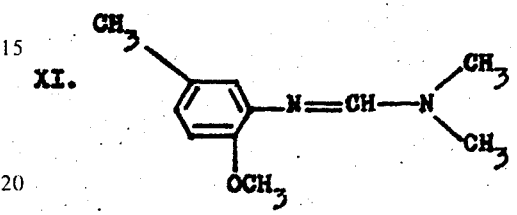

N-2-methoxy-5-methylphenyl-N':N'-dimethylformamidine
  Free base:
This was prepared from 50 milliliters of 2-methoxy-5-methylphenyl-isocyanate and 75 milliliters of dimethylformamide by the method described under Ia. Yield: 43.5 grams. Boiling point: 92° to 95°C at 0.05 millimeters of Hg.

| Analysis: | $C_{11}H_{17}O_3N_2Cl$(perchlorate prepared as described | | |
|---|---|---|---|
| under Ib) | | | |
| Calculated: | 45.13% C; | 5.85% H; | 9.57% N. |
| Found: | 45.09% C; | 6.09% H; | 9.67% N. |

The melting point of the perchlorate is 234° to 236.5°C.

XII 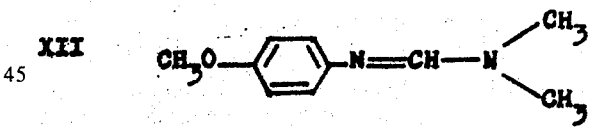

N-para-methoxyphenyl-N':N'-dimethylformamidine.
  Free base:
This was prepared from 50 milliliters of para-methoxyphenylisocyanate and 100 milliliters of dimethylformamide by the method described under Ia. Yield: 30 grams. Boiling point: 98°C at 0.03 millimeters of Hg.
  Perchlorate:
This was prepared by the method described under Ib. Melting point: 171° to 173°C (after recrystallization from alcohol).

| Analysis of the perchlorate: | $C_{10}H_{15}O_5N_2Cl$ | | |
|---|---|---|---|
| Calculated: | 43.09% C; | 5.43% H; | 10.05% N. |
| Found: | 43.3% C; | 5.7% H; | 10.3% N. |

The compounds listed in the following Table can be prepared in an analogous manner:

| Compound | Boiling point °C /mm Hg | Analysis (theoretical values in brackets) | | | |
|---|---|---|---|---|---|
| | | C | H | N | Cl |
| 1. Cl-C₆H₃(Cl)-N=CH-N(CH₃)₂ | 120-122°/0.15 | | | 12.85 (12.90) | 32.51 (32.66) |
| 2. CH₃-C₆H₄-N=CH-N(CH₃)₂ | 78-79°/0.05 | 73.76 (74.03) | 8.78 (8.70) | 17.41 (17.27) | |
| 3. C₃H₇(iso)-C₆H₄-N=CH-N(CH₃)₂ | 91-93°/0.18 | 75.94 (75.74) | 9.24 (9.54) | 14.72 (14.72) | |
| 4. CH₃-C₆H₃(Cl)-N=CH-N(CH₃)₂ | 123-125°/0.01 | 61.5 (61.07) | 7.0 (6.66) | | 18.2 (18.03) |
| 5. Cl-C₆H₄-N=CH-N(CH₃)₂ | 120-122°/0.02 | 59.4 (59.18) | 6.3 (6.07) | | 19.2 (19.41) |
| 6. CH₃-C₆H₃(NO₂)-N=CH-N(CH₃)₂ | 154°/0.1 | 58.03 (57.96) | 6.35 (6.32) | | 20.41 (20.28) |
| 7. Cl-C₆H₃(CH₃)-N=CH-N(CH₃)₂ | 94°/0.05 | 60.9 (61.07) | 6.5 (6.66) | | 13.9 (14.24) |
| 8. CH₃-C₆H₃(CH₃)-N=CH-N(CH₃)₂ | 93-94°/0.05 | 74.70 (74.95) | 9.19 (9.15) | | 15.97 (15.90) |
| 9. Cl-C₆H₃(Cl)-N=CH-N(CH₂CH₂)₂CH₂ (piperidino) | 167°/0.015 | 56.00 (56.05) | 5.38 (5.49) | 10.86 (10.89) | |
| 10. Cl-C₆H₃(Cl)-N=CH-N(CH₂CH₂)₂ (pyrrolidino) | 163-165°/0.02 | 54.19 (54.34) | 5.06 (4.97) | 11.28 (11.52) | |
| 11. Cl-C₆H₃(Cl)-N=CH-N(CH₂CH₂)₂O (morpholino) | 152-157°/0.03 | 50.82 (50.98) | 4.69 (4.67) | 10.70 (10.81) | |

— Continued

| Compound | Boiling Point °C/mm Hg | Analysis (theoretical values in brackets) C | H | N | Cl |
|---|---|---|---|---|---|
| 12. (3-Cl-C6H4)-N=CH-N(CH2CH2)2N-CH3 | 160-163°/0.18 | | | 17.7 (17.68) | 14.9 (14.91) |
| 13. (Cl, CF3-C6H3)-N=CH-N(CH2CH2CH2)2 | 143-145°/0.11 | 55.41 (55.18) | 5.35 (5.29) | | 11.57 (11.63) |
| 14. (Cl-C6H4)-N=CH-N(CH3)2 | 101-103°/0.06 | | | 15.21 (15.34) | 19.63 (19.41) |
| 15. (Cl-C6H4)-N=CH-N(CH2CH2CH2)2 | 161-162°/0.04 | 65.42 (65.92) | 7.11 (7.24) | 11.80 (11.85) | 15.50 (14.98) |
| 16. (CH3O, CH3-C6H3)-N=CH-N(CH3)2 | 160-161°/9 | 68.72 (68.72) | 8.54 (8.39) | 14.69 (14.57) | |
| 17. (Cl, CF3-C6H3)-N=CH-N(CH2CH2)2O | 140-143°/0.1 | 49.49 (49.24) | 4.34 (4.13) | 9.46 (9.57) | |
| 18. (C4H9-C6H4)-N=CH-N(CH3)2 | 106°/0.08 | 76.28 (76.42) | 9.91 (9.87) | 13.74 (13.71) | |

EXAMPLE 2 a. A wettable powder that can be diluted with water to give aqueous spraying liquors and that contains 20% of the active substance of the formula

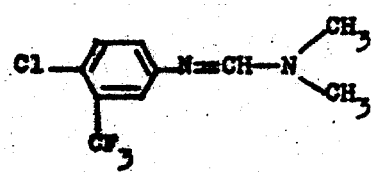

described in Example 1 under II, 75 percent of kaolin and 5 percent of lignin sulfonic acid as wetting and dispersing agent was prepared. Another filling agent, for example, talcum or chalk, can also be used instead of kaolin. As wetting and dispersing agents there can also be used other anionic compounds for example lauryl sulfonate or a non-ionic dispersing agent or mixtures thereof. The powder so obtained can be diluted with water as required.

b. A powder for the preparation of spraying solutions that contains as active substance the hydrogen sulfate of the compound of the formula

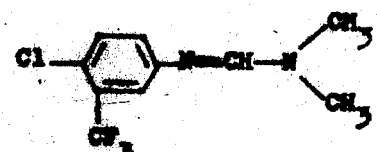

described in Example 1 under IIb was prepared in the manner described under (a).

c. 7.5 Parts of an emulsifier consisting of a mixture of 3 parts of the calcium or magnesium salt of mono-laurylbenzene-monosulfonic acid and 7 parts of a polyglycol ether of sorbitan-monolaurate were dissolved in 72.5 parts of butanol. 20 Parts of the active substance of the formula

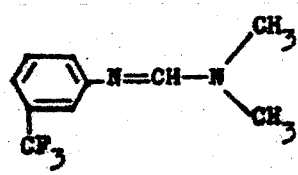

described in Example 1 under III were dissolved in this mixture. An opalescent solution was formed that can be diluted with water as required and that can be used as a spraying solution.

EXAMPLE 3

Seeds of the following plants were sown in flowerpots in a greenhouse: Setaria italica, Dactylis glomerata, Sinapis alba, Medicago sativa, Lepidium sativum and Calendula chrysantha.

A pre-emergent treatment was carried out 2 days after sowing with a spraying solution prepared as described in Example 2a) that contained as active substance the compound IIa Example 1, or with a spraying solution that contained as active substance the compound IIb of Example 1, the spray being applied at a rate corresponding to 10 kilograms of active substance per hectare.

Evaluation of the results about 20 days after the treatment showed that, in both cases, the above-mentioned plants were dead or damaged to such an extent (dactylis) that they could no longer develop normally.

EXAMPLE 4

The experiments were prepared in the manner described in Example 3. However, the post-emergent treatment of the said plants was carried out about 10 days after sowing when the plants had developed the first pair of leaves. The treatment was carried out with sprays prepared as described in Example 2a or 2b that contained as active substances the compounds described in Example 1 under IIa or IIb, the sprays being applied at a rate corresponding to 10 kilograms of active substance per hectare. 18 Days after the treatment Calendula, Lepidium and Medicago were dead in both cases, whereas Sinapis, Dactylis and Setaria were damaged to such an extent that they could no longer develop normally.

The compounds Va and Vb in Example 1 and the compounds (1), (9) and (18) in the Table are distinguished by a specially good herbicidal action.

EXAMPLE 5 a. Tomato and celery plants were sprayed with a solution prepared as described in Example (2c) that contained 0.2 percent of the active substance of the formula

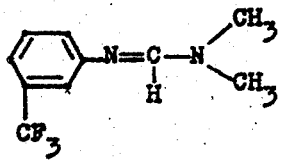

that is described in Example 1 under III.

2 Days after the treatment, some of the tomato plants were infected with the spores of Alternaria solani and others with the spores of Phytophthora infestans. The celery plants were infected with a spore suspension of Septoria apii. After the said plants had been infected with the fungi, they were placed in an incubation chamber for 2 days at a temperature of 22° to 26°C and at a relative humidity of 95 to 100 percent. Evaluation of the results (0 percent = no action; 100 percent = completely free from fungi attack) showed the following: Alternaria solani 100 percent, Phytophthora infestans 97 percent, Septoria apii 95 percent.

There were virtually no phytotoxic effects to be observed on the treated plants.

The compounds (1), (9), (10) and (11) in the Table in Example 1 and compound I in Example 1 are distinguished by a specially good fungicidal action.

EXAMPLE 6 a. The contact action of compound 18 in the table of Example 1 was tested on the house fly (Musca domestica).

The experiments were carried out in the following manner: a 0.01 percent solution of the said compound in ether was prepared. 1 Cubic centimeter of the solution was introduced into the bottom and cover of a Petri dish having a diameter of about 10 centimeters; the solvent was allowed to evaporate. 10 Flies were then introduced into the dish, the dish was covered and, after 4 hours, it was determined how many of the flies could no longer walk and were lying on their backs. The experiment was repeated five times.

The average action on the flies was 97 percent.

b. The contact action of compound 18 in the table of Example 1 was tested on the corn weevil (Calandria granaria). In this experiment, a 0.001 percent solution of the active substance in acetone showed a 100 percent action against Calandria granaria.

The ovicidal action of compound 18 in the table of Example 1 was tested on the eggs of the flour moth (Ephestia Kuehniella). A mixture prepared as described in Example 2c) that contained the said compound showed a 100 percent ovicidal action against Ephestia Kuehniella at an active substance concentration of 0.0125 percent.

EXAMPLE 7 a. The following compounds of this application were tested as to their acaricidal action: IV a; IV b; V; Table, Nos. 7 and 14. Dwarf beans, heavily infested with spinner mites (Tetranychus telarius) were treated all around with an aqueous spraying liquor prepared by diluting the emulsion concentrate described in Example 2 C containing 0.1 percent of active principle, the quantity used corresponding to about 1 kg per hectare.

b. 10 g each of the active substances described in Example 1 were dissolved in 100 g of acetone and the resulting solution treated with 80 g of an emulsifier consisting of the condensation product of 1 mol of paraditertiary octylphenol and 8 mols of ethylene oxide. The solution so obtained can be diluted with water in any desired proportion, for example to obtain a concentration of 100 to 10 ppm.

The nematocidal action of the compounds against Panegrellus redivivus was tested with a series of progressive dilutions so obtained. At a concentration of 100 ppm the mortality of Panegrellus redivivus was between 60 and 100 percent.

What is claimed is:
1. A compound of the formula

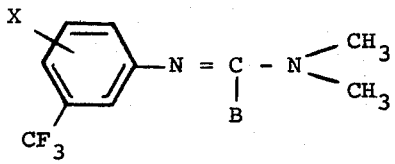

in which X is hydrogen, chlorine or CF$_3$, and B is hydrogen or methyl; or a salt thereof with an acid selected from the group consisting of HCl, HBr, HI, HF, H$_2$SO$_4$, H$_3$PO$_4$, HPO$_3$, HNO$_3$, HClO$_4$, HSO$_3$NH$_2$, CH$_3$COOH, CCl$_3$COOH, citric acid, lactic acid, formic acid, oxalic acid, glycolic acid, benzoic acid, oleic acid, 2,3,6-trichlorobenzoic acid, dodecylbenzenesulfonic acid, salicylic acid, nicotinic acid and CH$_3$CCl$_2$COOH.

2. The compound according to claim 1 which is N-(3-trifluoromethyl-4-chlorophenyl)-N',N'-dimethylformamidine.

3. The compound according to claim 1 which is N-(3-trifluoromethylphenyl)-N',N'-dimethylformamidine.

4. The compound according to claim 1 which is N-[3,5-di(trifluoromethyl)phenyl]-N',N'-dimethylformamidine.

5. The compound according to claim 1 which is N-[3,5-di(trifluoromethyl)phenyl]-N',N'-dimethylacetamidine.

* * * * *